United States Patent
Kotani

(10) Patent No.: US 8,669,997 B2
(45) Date of Patent: Mar. 11, 2014

(54) DISPLAY APPARATUS AND METHOD OF CONTROLLING THE SAME

(75) Inventor: Junji Kotani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 12/954,065

(22) Filed: Nov. 24, 2010

(65) Prior Publication Data

US 2011/0148904 A1    Jun. 23, 2011

(30) Foreign Application Priority Data

Dec. 21, 2009  (JP) ................................ 2009-289649

(51) Int. Cl.
*G09G 5/00*    (2006.01)
*G09G 3/30*    (2006.01)
*G09G 5/02*    (2006.01)
*G09G 5/10*    (2006.01)
*H04N 5/57*    (2006.01)
*H04N 9/31*    (2006.01)
*H04N 1/46*    (2006.01)
*G06K 9/40*    (2006.01)
*G06K 9/36*    (2006.01)

(52) U.S. Cl.
USPC ........... 345/589; 345/581; 345/643; 345/690; 345/77; 348/687; 348/744; 358/525; 358/509; 382/254; 382/274; 382/276

(58) Field of Classification Search
USPC ........ 345/581, 589, 426, 606, 617–619, 643, 345/204, 690, 691, 213, 12, 45, 48, 63, 345/76–77, 84–89; 348/254, 258, 333.1, 348/500, 519, 537–538, 671, 673, 687, 712, 348/739, 744; 358/504, 509–510, 516, 358/518–520, 525, 447–448; 382/162, 167, 382/254, 274, 276, 300
See application file for complete search history.

(56) References Cited

U.S. PATENT DOCUMENTS

| 6,847,374 B2 | 1/2005 | Matsuda | |
|---|---|---|---|
| 7,595,811 B2 | 9/2009 | Matsuda | |
| 2003/0053001 A1* | 3/2003 | Murashita et al. | 348/649 |
| 2006/0247877 A1* | 11/2006 | Bala et al. | 702/107 |
| 2008/0284767 A1* | 11/2008 | Mori et al. | 345/207 |
| 2010/0201894 A1* | 8/2010 | Nakayama et al. | 348/745 |

FOREIGN PATENT DOCUMENTS

| CN | 101217674 A | 7/2008 |
|---|---|---|
| JP | 2002-125125 | 4/2002 |
| JP | 2008-165231 A | 7/2008 |
| WO | 2009-142015 A | 11/2009 |

OTHER PUBLICATIONS

The above reference was cited in a Aug. 28, 2012 Chinese Office Action, without English Translation, that issued in Chinese Patent Application No. 201010608409.3.

(Continued)

*Primary Examiner* — Wesner Sajous
(74) *Attorney, Agent, or Firm* — Cowan, Liebowitz & Latman, P.C.

(57) ABSTRACT

A display apparatus according to this invention performs control so as to reduce the difference between image data input to a display unit and an image which is displayed on a display surface and acquired by an acquisition unit, based on the image data and the image.

18 Claims, 11 Drawing Sheets

(56) References Cited

OTHER PUBLICATIONS

The above reference was cited in a Sep. 13, 2013 Japanese Office Action, without an English Translation, that issued in Japanese Patent Application No. 2009-289649.

The above foreign patent document was cited in the Jun. 2, 2013 Chinese Office Action, with an English Translation, that issued in Chinese Patent Application No. 201010608409.3.

* cited by examiner

DISPLAY APPARATUS AND METHOD OF CONTROLLING THE SAME

BACKGROUND OF THE INVENTION

1. Field of the Invention

The present invention relates to a display apparatus and a method of controlling the display apparatus.

2. Description of the Related Art

As conventional projection apparatus which projects and displays an image on a screen, a projector which projects and displays an image generated on a liquid crystal panel on a screen is known. If external light (illumination light) has a high brightness, the contrast of the image projected and displayed on the screen by the projector often decreases due to the influence of the brightness of the external light. When the contrast of the projected and displayed image decreases, a pixel expected to be black may not appear black or a pixel expected to be vivid white may appear dull white.

To combat this problem, Japanese Patent Laid-Open No. 2002-125125 (corresponding to U.S. Pat. Nos. 6,847,374 and 7,595,811) describes a projector 20 in which the brightness of illumination light is measured, and an image to be reproduced is corrected so as to raise the output power in a low gray level region when the illumination light is brighter than a standard visual environment. Thus, deterioration in appearance in a low gray level region due to factors associated with the illumination light can be improved in the reproduced image, according to Japanese Patent Laid-Open No. 2002-125125 (corresponding to U.S. Pat. Nos. 6,847,374 and 7,595,811).

However, in such a projector, if external light (illumination light) has a low brightness, the contrast also decreases due to factors associated with "returning light" generated when light emitted by the projector itself is reflected by the screen, further reflected by, for example, the wall or the ceiling, and captured on the screen again. That is, the returning light may have a more serious influence on the quality of the projected and displayed image than the illumination light. The returning light means herein light which is a component of light applied (projected) from the projector onto the screen, and is reflected by the screen, is further reflected by the surrounding environment such as the wall or ceiling of the room, and reaches the screen again. That is, if an offset due to factors associated with the returning light is generated in the projected and displayed image (projected image), the quality of the image degrades as the image is colored or blurred in white.

The problem to be solved by the present invention will be described in detail with reference to FIG. 11.

A projector 100 receives an image signal from an image signal source (not shown), and projects and displays an image 201 corresponding to the image signal on a screen 200. At this time, if the surrounding environment (for example, a wall, a ceiling, a floor, a fixture, or furniture; none are shown) is capable of reflecting light, a certain component of light which forms the image 201 is reflected by the screen 200, is further reflected by the surrounding environment, and reaches the screen 200 again. In this way, returning light irradiates the projected and displayed image 201.

Furthermore, this problem becomes conspicuous when an image with poor color balance is projected and displayed. Assume that the image 201 includes a blue image for the most part (a hatched portion in FIG. 11), and a window 202 including a full-color image. In this case, since the image 201 contains a blue component in large amounts, returning light, in turn, contains a blue component in large amounts assuming that the surrounding environment is not colored. As for the hatched portion of the image 201, blue returning light is superposed on the blue image and therefore has little influence on its observation. In contrast, as for the portion of the full-color window 202, a bluish image is inappropriately presented to the observer. That is, the quality of the projected and displayed image (projected image) degrades.

The present invention suppresses degradation in quality of a projected image due to factors associated with light projected by a projection apparatus as mentioned above.

According to the present invention, it is possible to suppress degradation in quality of a projected image due to factors associated with light projected by a projection apparatus.

SUMMARY OF THE INVENTION

According to the first aspect of the present invention, there is provided a display apparatus comprising: a display unit adapted to display an image corresponding to input image data on a display surface; an acquisition unit adapted to acquire the image displayed on the display surface by the display unit; and a controller adapted to control the display unit so as to reduce a difference between the input image data and the image displayed on the display surface by the display unit, based on the image data input to the display unit, and the image acquired by the acquisition unit.

According to the second aspect of the present invention, there is provided a display apparatus comprising: a display unit adapted to display an image corresponding to input image data on a display surface; an acquisition unit adapted to acquire the image displayed on the display surface by the display unit; and a controller adapted to control the display unit so as to reduce a difference between the input image data and the image displayed on the display surface by the display unit, based on a plurality of image data input to the display unit, and images which correspond to the plurality of image data and are acquired by the acquisition unit.

According to the third aspect of the present invention, there is provided a method of controlling a display apparatus comprising a display unit adapted to display an image corresponding to input image data on a display surface, and an acquisition unit adapted to acquire the image displayed on the display surface by the display unit, the method comprising: controlling the display unit so as to reduce a difference between the input image data and the image displayed on the display surface by the display unit, based on the image data input to the display unit, and the image acquired by the acquisition unit.

According to the fourth aspect of the present invention, there is provided a method of controlling a display apparatus comprising a display unit adapted to display an image corresponding to input image data on a display surface, and an acquisition unit adapted to acquire the image displayed on the display surface by the display unit, the method comprising: controlling the display unit so as to reduce a difference between the input image data and the image displayed on the display surface by the display unit, based on a plurality of image data input to the display unit, and images which correspond to the plurality of image data and are acquired by the acquisition unit.

Further features of the present invention will become apparent from the following description of exemplary embodiments with reference to the attached drawings.

DESCRIPTION OF THE EMBODIMENTS

The embodiments will be described with reference to the drawings.

First Embodiment

Figure 1:
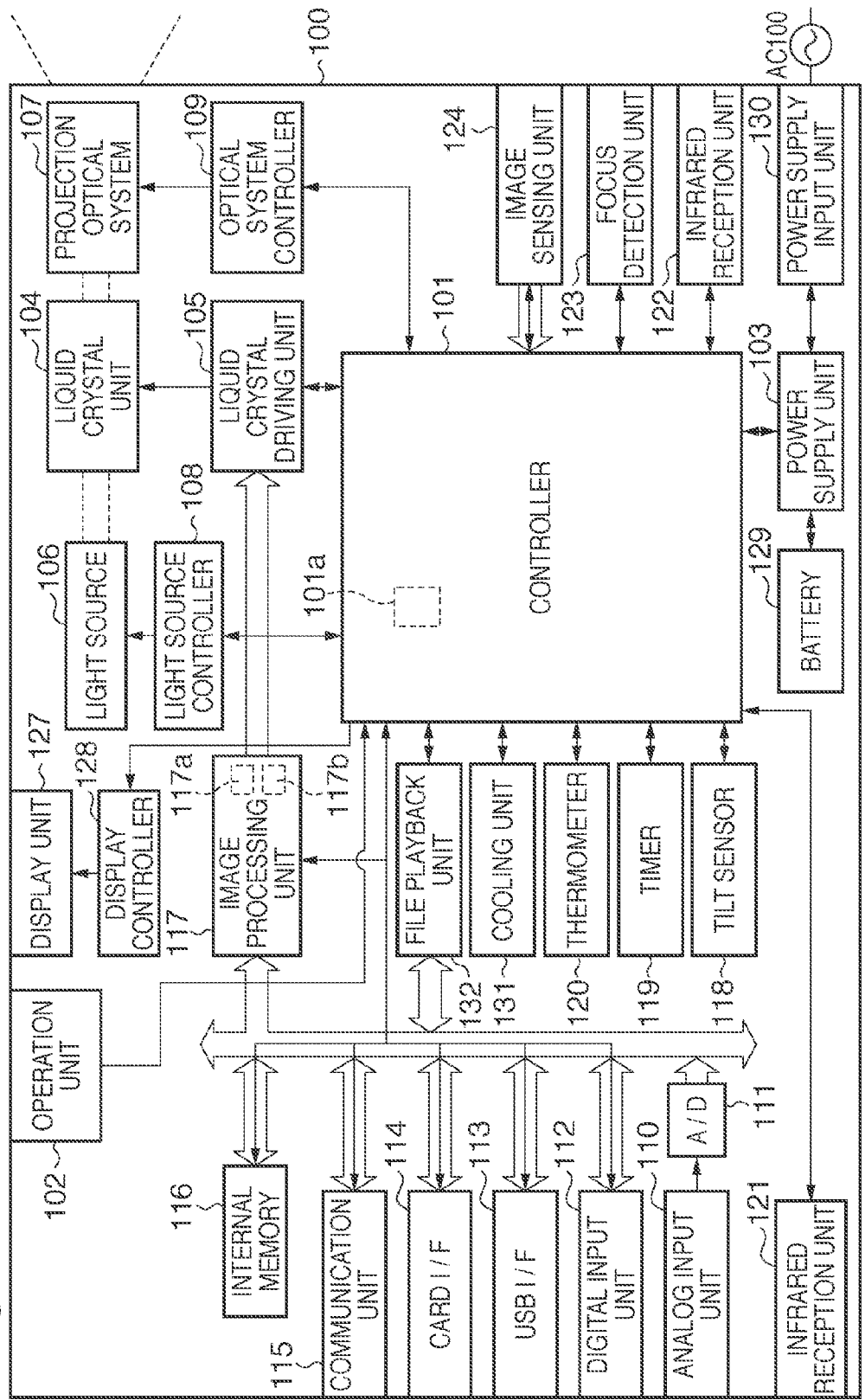
FIG. 1 is a block diagram of a projector according to the first embodiment.

The configuration of a projector (projection apparatus) 100 according to the first embodiment will be described with reference to FIG. 1. Note that the following embodiments do not limit the present invention according to the scope of claims, and not all combinations of features described in these embodiments are indispensable for solving means of the present invention.

Figure 11:
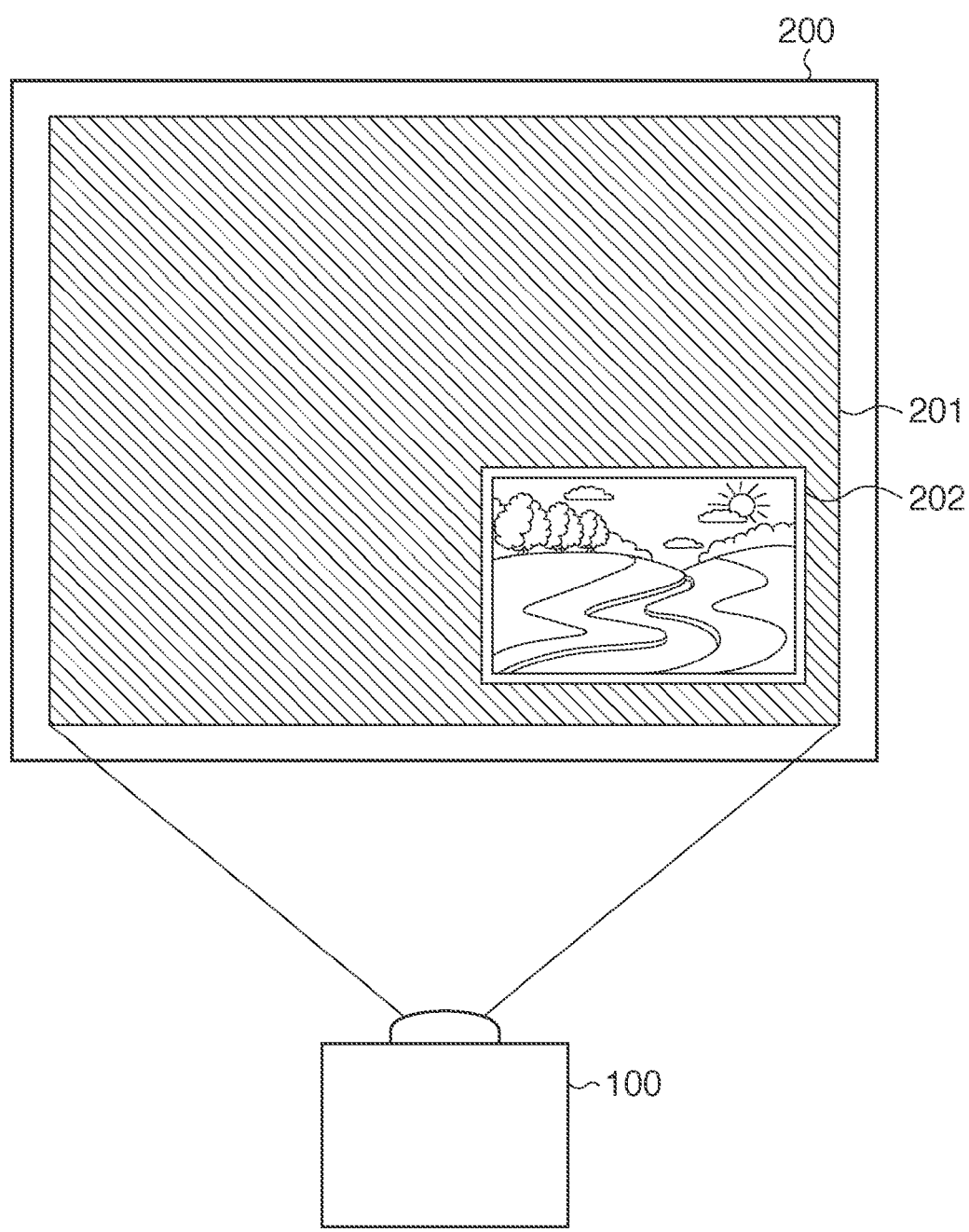
FIG. 11 is a view that explains returning light.

Prior to a detailed description of the first embodiment, the concept of returning light will be explained first with reference to FIG. 11. When projection light corresponding to a certain image is projected from the projector 100 onto a screen 200, a certain component of the light is reflected by the screen 200 in accordance with a screen gain. Assuming that the wall, ceiling, and floor of a room in which the projector 100 is installed are assumed to have been made of general materials, light reflected by the screen 200 is naturally absorbed by the wall and ceiling of the room or diffusely reflected by them. A certain component of the light diffusely reflected by the wall and ceiling reaches the screen 200 again. In the first embodiment, this system is approximated using a model in which a certain component of light emitted by the projector 100 is integrated upon being diffusely reflected in the room, and reaches the entire screen again.

The configuration of the projector (projection apparatus) 100 according to the first embodiment will be described next with reference to FIG. 1. The projector 100 shown in FIG. 1 includes the following constituent elements.

An operation unit 102 receives an instruction from the user, and sends the received instruction to a controller 101. The controller 101 systematically controls each unit of the projector 100 in accordance with the sent instruction.

A power supply unit 103 controls power supply to each unit of the projector 100 under the control of the controller 101. When, for example, the operation unit 102 receives and sends a start-up instruction to the controller 101, the power supply unit 103 receives a start-up command corresponding to the start-up instruction from the controller 101. The power supply unit 103 starts to supply power to each unit in accordance with the start-up command.

A light source controller 108 controls, for example, the amount of light emitted by a light source 106, under the control of the controller 101. In response to this, the light source 106 supplies light to a liquid crystal unit 104.

A liquid crystal driving unit 105 receives image information from an image processing unit 117. The liquid crystal driving unit 105 drives a liquid crystal panel of the liquid crystal unit 104 in accordance with the received image information to form an image on the liquid crystal panel of the liquid crystal unit 104. In response to this, the liquid crystal unit 104 is driven by the liquid crystal driving unit 105 to form an image on the liquid crystal panel. The liquid crystal unit 104 includes, for example, one or three liquid crystal panels as mentioned above.

A projection optical system (projection means) 107 receives light which is emitted by the light source 106 and transmitted through the liquid crystal unit 104. Thus, the projection optical system 107 projects projection light modulated in accordance with image data onto the screen 200 so that a projected image corresponding to the image data is displayed on the screen (target surface) 200. The projection optical system 107 includes a zoom lens and focus lens that can be driven along the optical axis.

A focus detection unit 123 detects the distance from the projector 100 to the screen 200 to detect a focal position. The focus detection unit 123 provides information on the focal position to the controller 101.

An optical system controller 109 controls the operation of the projection optical system 107. The optical system controller 109 adjusts, for example, the zoom ratio by controlling the operation of the zoom lens of the projection optical system 107. Alternatively, the optical system controller 109 adjusts, for example, the focus of the projection optical system 107 by controlling the projection optical system 107 to drive the focus lens to the focal position, upon receiving information on the focal position from the controller 101.

An analog input unit 110 receives an analog image signal from, for example, a PC, a DVD player, or a television tuner, and provides it to a D/A conversion unit 111. The analog input unit 110 includes, for example, an RGB terminal and S terminal.

The D/A conversion unit 111 converts an analog image signal received from the analog input unit 110 into a digital image signal. The D/A conversion unit 111 provides the converted digital image signal to the image processing unit 117.

A digital input unit 112 receives a digital image signal from, for example, a PC or a DVD player. The digital input unit 112 includes, for example, an HDMI terminal. In case of an HDMI terminal, not only an image signal but also a control signal may be externally transmitted to the digital input unit 112 at once, and the digital input unit 112 then receives and provides these signals to the image processing unit 117. Thus, the image processing unit 117 performs, for example, image processing corresponding to the image signal in accordance with the control signal.

A pointing device, a keyboard, or a USB storage medium (for example, a flash memory), for example, can be connected to a USB interface 113. If a USB storage medium is connected to the USB interface 113, the USB interface 113 receives various types of information data (for example, image data) or files containing them from the storage medium, or writes them onto the storage medium.

An SD card or a compact Flash®, for example, can be inserted into a card interface 114. If a card-type recording medium is inserted into the card interface 114, the card interface 114 reads/writes various types of information data or files containing them.

A communication unit 115 receives various types of information data, files containing them, or various types of command signals via a communication line (for example, an intranet or the Internet), and provides them to the controller 101. Also, the communication unit 115 transmits various types of information data, files containing them, or various types of command signals, provided from the controller 101, via a communication line. The communication unit 115 is, for example, a communication interface connected to, for example, a wired LAN or a wireless LAN.

An internal memory 116 stores various types of information data or files containing them. The internal memory 116 includes, for example, a semiconductor memory and hard disk.

A file playback unit 132 plays back a predetermined file. When, for example, the operation unit 102 provides a predetermined file to the controller 101 in accordance with a playback instruction, the file playback unit 132 receives a playback command corresponding to the playback instruction from the controller 101. The file playback unit 132, for example, accesses a recording medium via the card interface 114 in accordance with the playback command, and acquires and plays back a document file recorded on the recording medium. More specifically, the file playback unit 132 generates an image signal to be presented to the user from the document file, and provides the generated image signal to the image processing unit 117.

The image processing unit 117 performs a correction, suitable for displaying an image corresponding to an image signal on the liquid crystal unit 104, for the image signal obtained by the USB interface 113, card interface 114, file playback unit 132, or controller 101. For example, the image processing unit 117 converts the number of pixels of the image signal into that which corresponds to the number of pixels of the liquid crystal panel, doubles the frame rate of the input image signal for AC driving of the liquid crystal panel, and performs a correction suitable for image formation by the liquid crystal panel. The AC driving of the liquid crystal panel means herein a method of displaying images on the liquid crystal panel upon alternately switching the direction of the voltage applied to the liquid crystal of this panel. This method utilizes the property of the liquid crystal panel that it can generate an image regardless of whether the direction of the voltage applied to the liquid crystal is forward or reverse. At this time, one forward image and one reverse image must be sent to the liquid crystal driving unit 105, so the image processing unit 117 performs a process of doubling the frame rate of the image signal. With these processes, the image processing unit 117 generates and provides image data to the liquid crystal driving unit 105. Thus, the liquid crystal driving unit 105 forms an image corresponding to the image data on the liquid crystal panel of the liquid crystal unit 104.

If an image is obliquely projected onto the screen 200 and the projection window distorts in, for example, a trapezoidal shape, the image processing unit 117 also performs keystone correction, for deforming an image, for the projected image so as to cancel the trapezoidal distortion. In the keystone correction, the image processing unit 117 changes the enlargement/reduction ratio, in the horizontal direction and/or vertical direction, of the image displayed on the liquid crystal panel. Thus, the image processing unit 117 cancels the trapezoidal distortion on the projection window and the distortion of the image region on the display device (liquid crystal panel) so as to bring the current image display region close to a rectangular image display region with a normal aspect ratio, thereby displaying the image on the screen 200. The image processing unit 117 may automatically perform the keystone correction based on the tilt angle obtained by a tilt sensor 118 (to be described later), or perform this correction as the user operates, for example, the operation unit 102.

Moreover, the image processing unit 117 includes a correction unit 117a. The operation of the correction unit 117a will be described later.

The tilt sensor 118 detects the tilt of the projector 100. A timer 119 detects, for example, the operating times of the projector 100 and each block. A thermometer 120 measures, for example, the temperatures of the light source 106 and liquid crystal unit 104, and the temperature of the outer atmosphere.

Infrared reception units 121 and 122 receive infrared rays from a remote controller attached to the projector 100 or other devices, and send signals to the controller 101. Pluralities of infrared reception units 121 and 122 are placed at pluralities of points in the projector 100 in, for example, the front-to-back direction. In this embodiment, the infrared reception unit 121 is disposed in back of the main body of the projector 100, while the infrared reception unit 122 is disposed in front of the main body of the projector 100.

An image sensing unit (measurement means) 124 senses the projected image displayed on the screen (target surface) 200. Also, the image sensing unit 124 measures the brightness of a predetermined measurement region in the projected image displayed on the screen 200. In this embodiment, a function of correcting returning light is implemented using the measurement result obtained by the image sensing unit 124, and a detailed description thereof will be given later.

A display unit 127 is disposed in the main body of the projector 100, and displays, for example, the state of the projector 100 and warnings. A display controller 128 controls the display unit 127.

A battery 129 supplies power to each unit of the projector 100 when, for example, the main body of the projector 100 is used while being carried. A power supply input unit 130 is externally supplied with AC power (AC 100), rectifies it to have a predetermined voltage, and supplies it to the power supply unit 103.

A cooling unit 131 cools the projector 100 by, for example, releasing heat in the projector 100 to the outside. The cooling unit 131 includes, for example, a heat sink and fan.

The schematic operation of the projector 100 will be described next.

In response to a power-on instruction issued from the operation unit 102, the controller 101 issues a command to the power supply unit 103 to supply power to each block so that each block assumes a standby state. After power is input to each block, the controller 101 issues a command to the light source controller 108 to start light emission by the light source 106. The controller 101 issues a command to the optical system controller 109 to adjust the projection optical system 107 based on, for example, information on the focal point obtained by the focus detection unit 123. The optical system controller 109 performs control so that an in-focus state in which the projection light forms an image on the window of the screen 200 is obtained by operating the zoom lens and focus lens of the projection optical system 107.

In this way, preparation for projection is completed. Next, for example, the image processing unit 117 converts the image signal input to the digital input unit 112 into image data with a resolution suitable for the liquid crystal unit 104, and performs gamma correction, correction against brightness nonuniformity, and keystone correction of the image data. The image data corrected by the image processing unit 117 is formed on the liquid crystal unit 104 as an image by the liquid crystal driving unit 105.

The image formed on the liquid crystal panel of the liquid crystal unit 104 is guided to the projection optical system 107 by means of light emitted by the light source 106, and is projected onto the screen 200 by the projection optical system 107.

During the projection, the controller 101 detects the temperature of, for example, the light source 106 using the thermometer 120, and cools the projector 100 by operating the cooling unit 131 when, for example, the temperature of the light source 106 has risen to 40° or more.

In response to a power-off instruction issued from the operation unit 102, the controller 101 communicates with each block so that they perform end processing. After each block prepares to end its operation, the power supply unit 103 sequentially ends the power supply to each block. The cooling unit 131 operates for a while even after power-off to cool the projector 100.

Although the image signal input from the digital input unit 112 is displayed in this embodiment, the same process is also performed when the image data input from the above-mentioned various types of interfaces are displayed.

A process for correcting returning light in this embodiment will be described next with reference to FIG. 2. A case in which external light has no influence on this process will be assumed herein. A case in which external light influences this process will be described later.

In step S300, the controller 101 starts a process for correcting returning light. More specifically, while emitting light after power input, the projector 100 can receive an instruction to start returning light correction from the user via the operation unit 102. This operation can be implemented by detecting depression of an "AUTOSET" button (not shown) included in the operation unit 102 by the controller 101.

The correction may be started using a method other than the above-mentioned method. The correction may be started when, for example, the controller 101 receives a start instruction from the communication unit 115, or receives a start instruction from the user via the infrared reception units 121 and 122. Alternatively, the controller 101 may automatically start the correction immediately after light emission after start-up or immediately after preparation for projection is completed. Or again, the controller 101 may automatically start the correction using a change in surrounding environment as a trigger by detecting movement of the projector 100 or a change in characteristic of external light (illumination light) and thereby estimating the change in surrounding environment. When, for example, the brightness of the illumination light becomes lower than a predetermined threshold, the controller 101 may start the correction by determining that the projector 100 becomes ready to start the correction. The correction may be started when, for example, it is detected that the brightness of the light source 106 has stabilized, the time taken for the brightness of the light source 106 to stabilize after power-on has elapsed, or the ambient temperature of the light source 106 has reached a predetermined temperature.

In step S301, the controller 101 issues a command to the image processing unit 117 to display an image of a test pattern. The image processing unit 117 forms an image corresponding to the image data of the test pattern on the liquid crystal panel of the liquid crystal unit 104 via the liquid crystal driving unit 105. The projection optical system 107 receives light transmitted through the liquid crystal unit 104 from the light source 106 (light modulated in accordance with the image data of the test pattern). In response to this, the projection optical system 107 projects the projection light modulated in accordance with the image data of the test pattern on the screen 200 so that a projected image corresponding to the image data of the test pattern is displayed on the screen 200. Note that if the image processing unit 117 has already started returning light correction, the controller 101 issues an instruction to stop this correction in step S301 as well. Display of a test pattern 400 in step S301 will be described in detail with reference to FIG. 3.

Figure 3:
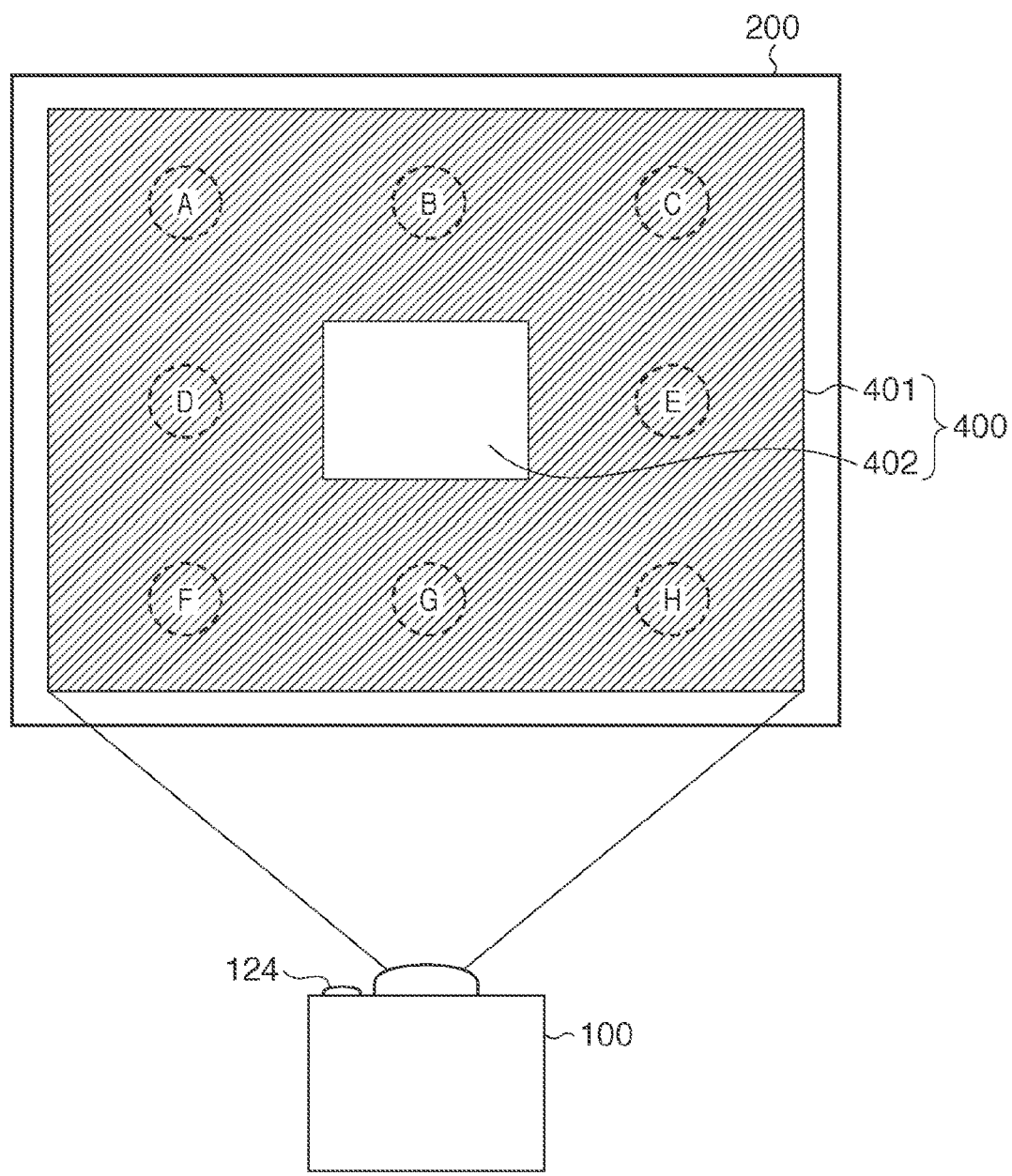
FIG. 3 is a view for explaining a test pattern in the first embodiment.

FIG. 3 shows the state in which a projected image of the test pattern 400 is displayed on the screen 200. The test pattern 400 includes a black image for the most part, but also includes an image with a brightness higher than black at its center. That is, the test pattern 400 includes a first region 401 having a black tone, and a second region 402 having a tone with a brightness higher than a black tone. In the test pattern 400, for example, the second region 402 is at its center, and the first region 401 surrounds the second region 402. The second region 402 has, for example, a white tone. Note that reference symbols A to H in the first region 401 in FIG. 3 denote predetermined measurement regions (to be described later). These measurement regions may have any size and shape in place of those in an example shown in FIG. 3.

In step S302, the image sensing unit 124 senses the projected image displayed on the screen 200 to generate and provide a sensed image signal of the projected image of the test pattern 400 to the controller 101. The controller 101 analyzes the projected image of the test pattern 400 to measure the brightness of the first region 401 in the projected image of the test pattern 400. More specifically, the controller 101 measures the brightness values of the predetermined measurement regions A to H (see FIG. 3) for each of R, G, and B (Red, Green, and Blue) components, and calculates the average of the brightness values of the predetermined measurement regions A to H for each of R, G, and B components. The brightness values of the respective measurement regions are included in the brightness of the first region 401 having a black tone, and therefore can be said to be equivalent to the brightness of returning light on the screen 200, which results from the projection light in the second region 402. The returning light is light which is a component of the projection light projected by the projection optical system 107, and is reflected by the screen 200, is further reflected by the surrounding environment, and enters the screen 200 again. The controller 101 uses the average of the brightness values of the predetermined measurement regions A to H for each of R, G, and B components as the brightness of returning light for each of R, G, and B components.

In step S303, the controller 101 calculates the amount of correction. More specifically, the controller 101 receives the image data of the test pattern 400 to be projected from the liquid crystal driving unit 105, and obtains an average brightness of an image of the image data of the test pattern 400. From the average brightness R obtained from the image data, and the brightness values of the predetermined measurement regions (the average of the brightness values of the measurement regions A to H), the controller 101 estimates, for each of R, G, and B components, a ratio $\alpha$ of the brightness of returning light to the expected average brightness of an image formed upon projecting the test pattern 400. That is, the controller 101 divides the average of the brightness values of the measurement regions A to H by the expected average brightness $\beta$ of the image of the test pattern 400 to estimate the ratio of the brightness of returning light to the expected average brightness of the image. This ratio is defined as $\alpha c$ (c=R, G, B). Although variables defined as $\alpha c$ exist equal in number to R, G, and B components, the suffix c indicating these components will be omitted. Although the average brightness $\beta$ of the image of the test pattern 400 is obtained from the image data of the test pattern 400 in this embodiment, it may be obtained by another method. That is, the projection window of the test pattern 400 may be sensed, the average brightness of the second region 402 in the sensed image may be measured, and the average brightness β of the image of the test pattern 400 may be calculated based on the area ratio between the entire projection region and the second region 402.

In other words, a brightness offset α times the average brightness β of the image data of the test pattern 400 is generated in the projected image displayed on the screen 200 due to the influence of returning light. Details of this mechanism will be described with reference to FIGS. 4A to 4D. FIGS. 4A to 4D are histograms which show the gray level of the image on the abscissa, and the number of pixels on the ordinate.

Figure 4:
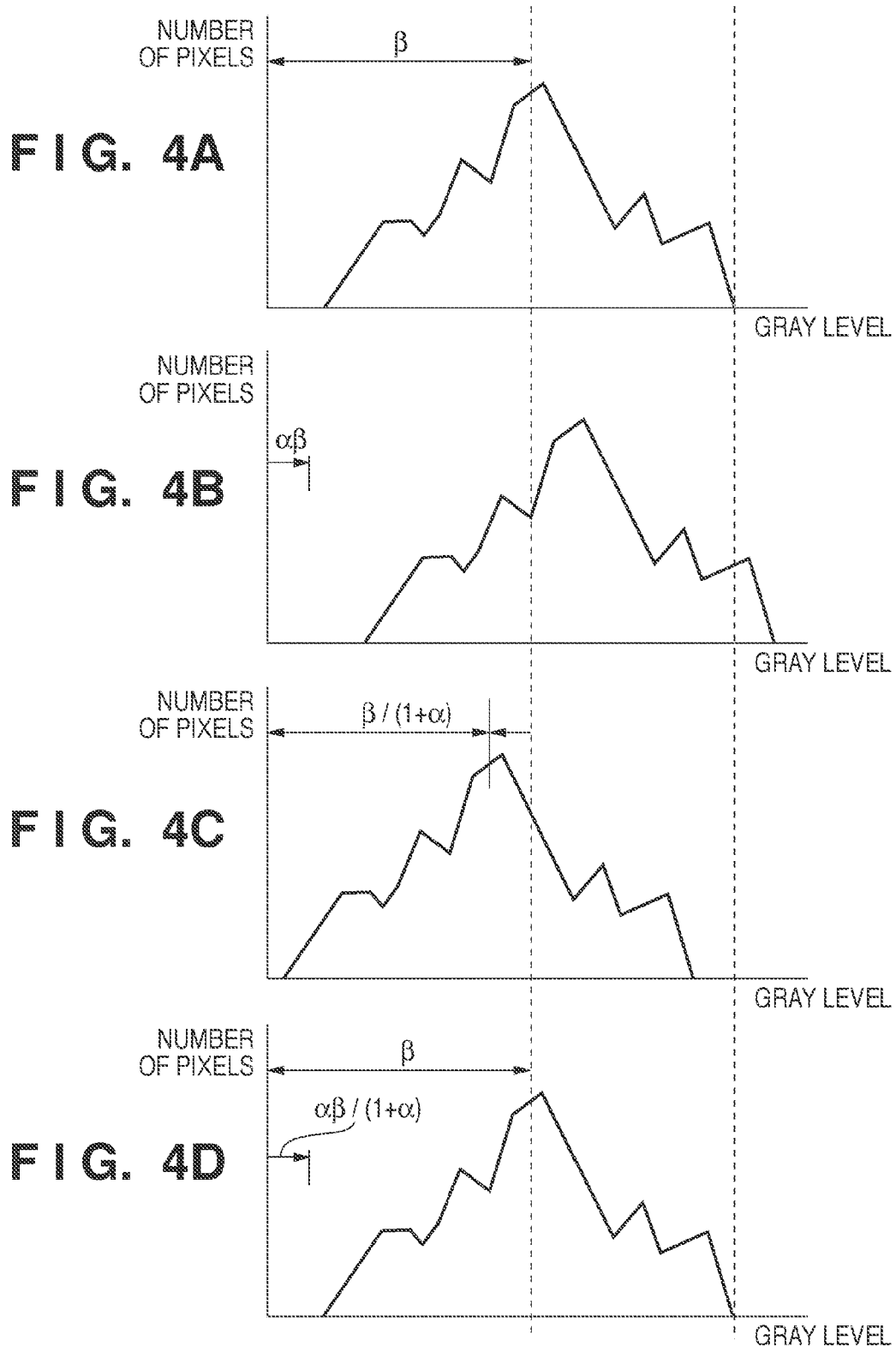
FIGS. 4A to 4D are histograms for explaining offset correction in the first embodiment.

FIG. 4A is a histogram of the image data of the test pattern 400. From the histogram of the image data of the test pattern 400, the average brightness of the image data of the test pattern 400 is defined. The average brightness β is the expected average brightness of the image when no returning light is present (when, for example, the surrounding environment is covered with a blackout curtain). That is, the average brightness β is the average brightness of the image, which is expected to be obtained when projection light modulated in accordance with the image data is projected onto the screen 200.

FIG. 4B is a histogram of a projected image (a projected image corresponding to the image data of the test pattern 400) of the test pattern 400, which is displayed on the screen 200. A certain component of the projection light projected by the projection optical system 107 is reflected by the screen 200, is integrated upon being diffusely reflected in the room, and enters the screen 200 again as returning light, and thereupon an offset αβ is added to the brightness values of all pixels, as shown in FIG. 4B.

FIG. 4C is a histogram of the corrected image data of the test pattern 400 when returning light correction to be described next is performed.

The concept of the correction will be explained first. An input x defined as the expected average brightness of an image when no returning light is present, and an output y defined as the average brightness of a projected image when returning light acts, have an input/output relationship:

$$y = x(1+\alpha) \quad (1)$$

Assuming that a projected image free from any returning light is to be attained as the output, the output y is substituted by the average brightness β of the image data of the test pattern 400 before correction. Also, the input x is substituted by an average brightness β' of the image data of the test pattern 400 after the correction. Solving equation (1) for β' yields a correction equation:

$$\beta' = \beta/(1+\alpha) \quad (2)$$

As can be seen from the foregoing calculation, equation (2) means that when projection light modulated in accordance with the image data having the average brightness β' is projected, the same projected image as that which has the average brightness β and is virtually free from any returning light is displayed upon adding the brightness of returning light resulting from the projection to the average brightness β'. An amount of offset correction "offset" when the projected image is attained by offset correction is given by:

$$\text{offset} = \beta - \beta' = \alpha\beta/(1+\alpha) \quad (3)$$

Solving equation (3) for β' yields:

$$\beta' = \beta - \text{offset} = \beta - \alpha\beta/(1+\alpha) \quad (4)$$

As seen from equation (4), when the image data of the test pattern 400 is corrected so that the amount of offset correction "offset", which satisfies equation (3), is removed from the average brightness β of the image data of the test pattern 400, the average brightness of the corrected image data of the test pattern 400 becomes β'.

FIG. 4D is a histogram of a projected image of the test pattern 400 after the correction (a projected image corresponding to the corrected image data of the test pattern 400), which is displayed on the screen 200. That is, FIG. 4D is a histogram of a projected image when returning light acts upon projecting projection light modulated in accordance with the image data shown in FIG. 4C onto the screen 200. Substituting an input x=β' and equation (2) into equation (1) yields an output y:

$$y = \beta'(1+\alpha) = \beta$$

That is, because the brightness offset due to factors associated with returning light is $\alpha\beta' = \alpha\beta/(1+\alpha)$ from equation (1), it cancels equation (3). That is, the offset correction shown in equation (3) or (4) cancels returning light, and the corrected image data of the test pattern 400 then has an average brightness equal to the expected average brightness (see FIG. 4A) of the image when no returning light is present.

In step S304, the controller 101 performs correction setting. That is, the controller 101 stores information on the ratio α of the brightness of returning light to that of projection light in the internal memory (storage means) 116. The internal memory 116 stores the ratio α. Also, the controller 101 sets the image processing unit 117 so as to start image correction using the constant α for each frame.

In step S305, the controller 101 accesses the liquid crystal driving unit 105, and erases the image data of the test pattern 400. Thus, the image of the test pattern 400 formed on the liquid crystal panel of the liquid crystal unit 104 is erased as well.

In step S306, the controller 101 starts to project image data to be displayed. More specifically, the correction unit 117a of the image processing unit 117 asynchronously performs the following correction process in accordance with the above-mentioned setting by the controller 101. The correction unit 117a sequentially stores, in the internal memory 116, image data, to be displayed, of each of a plurality of frames sequentially input to it, and calculates (obtains) an average brightness βd of the image data of each frame for each of R, G, and B components. Also, the correction unit 117a accesses the internal memory 116, and acquires information on the ratio α of the brightness of returning light to that of projection light. The correction unit 117a corrects the image data to be displayed so that a projected image is displayed on the screen (target surface) 200 after the brightness of returning light is canceled, in accordance with the estimated ratio α and the average brightness βd of the image data to be displayed. More specifically, the correction unit 117a performs correction in which βd and βd' are substituted for β and β', respectively, in equation (2) presented above. That is, the correction unit 117a corrects the image data, to be displayed, of the pattern so that the average brightness βd' of the corrected image data, to be displayed, of the pattern satisfies:

$$\beta d' = \beta d/(1+\alpha) \quad (5)$$

where βd is the average brightness of the image data to be displayed. More specifically, the correction unit 117a performs correction in which βd and βd' are substituted for β and β', respectively, in equation (4) presented above. That is, the correction unit 117a corrects the image data to be displayed so as to remove the amount of offset correction "offset" which satisfies:

$$\text{offset} = \alpha\beta d/(1+\alpha) \qquad (6)$$

from the brightness of each pixel of the image data to be displayed. At this time, the correction unit 117a corrects image data, to be displayed, of a plurality of frames included in a moving image, for each frame in accordance with the ratio α stored in the internal memory 116. Also, the correction unit 117a corrects the image data to be displayed so that a projected image is displayed on the screen (target surface) 200 after the brightness of returning light is canceled for each color component. The image processing unit 117 sequentially receives the corrected image data, to be displayed, of each frame from the correction unit 117a, and sequentially outputs them to the liquid crystal driving unit 105. Thus, the projection optical system 107 sequentially projects projection light modulated in accordance with the corrected image data, to be displayed, of each frame onto the screen 200. The projected image corrected in the foregoing way is close to a projected image obtained under the environment in which no returning light is present.

As described above, the ratio of the brightness of returning light, which is a component of the projection light in the second region 402, and is reflected by the screen 200 and the surrounding environment (not shown), and returns to the screen 200 again, to the expected average brightness of the image can be estimated. From the estimated ratio and the average brightness of the image data to be displayed, an amount of offset correction, which cancels a brightness resulting from returning light as mentioned above, can be calculated for each image data to be displayed (for each frame). This makes it possible to obtain a projected image in which returning light is canceled in each frame. That is, according to this embodiment, it is possible to suppress degradation in quality of a projected image due to factors associated with projection light from the projector (projection apparatus) 100.

Also, since both measurement and correction of the brightness for each of R, G, and B components can be performed, returning light can be corrected even if it contains a component in a specific color in large amounts and this deteriorates the color balance of the projected image.

Figure 2:
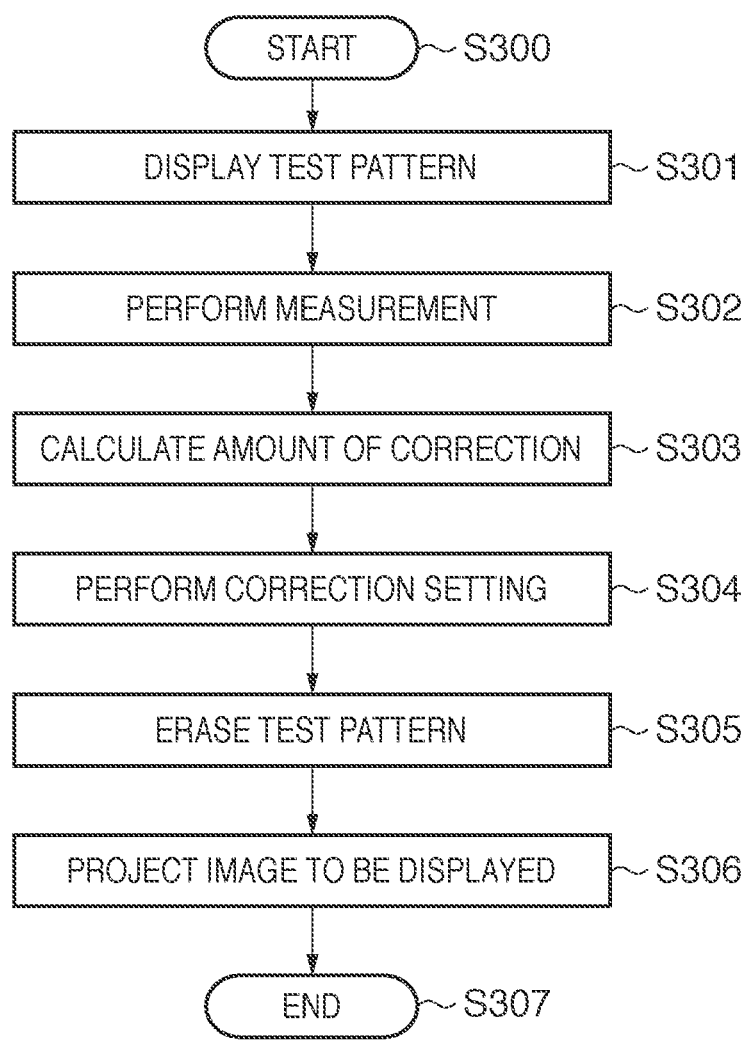
FIG. 2 is a flowchart showing a correction sequence in the first embodiment.

Note that a process of measuring the RGB brightness values of a plurality of measurement regions such as the measurement regions A to H shown in FIG. 3, and calculating the average of these values is performed in the sequence shown in FIG. 2 for noise reduction. A larger or smaller number of measurement regions may be used. Also, the brightness of only a single measurement region may be measured. The same effect as in this embodiment can be achieved even when, for example, the brightness of only the single measurement region A is measured instead of measuring those of the plurality of measurement regions A to H shown in FIG. 3.

Also, the image sensing unit 124 may be an inexpensive photometric sensor which can measure the brightness of only a single measurement region, in place of an area sensor. When the brightness values of a plurality of measurement regions are measured using the photometric sensor, the projector (projection apparatus) 100 must further include an arrangement in which this sensor is sequentially directed to the plurality of measurement regions.

Figure 5:
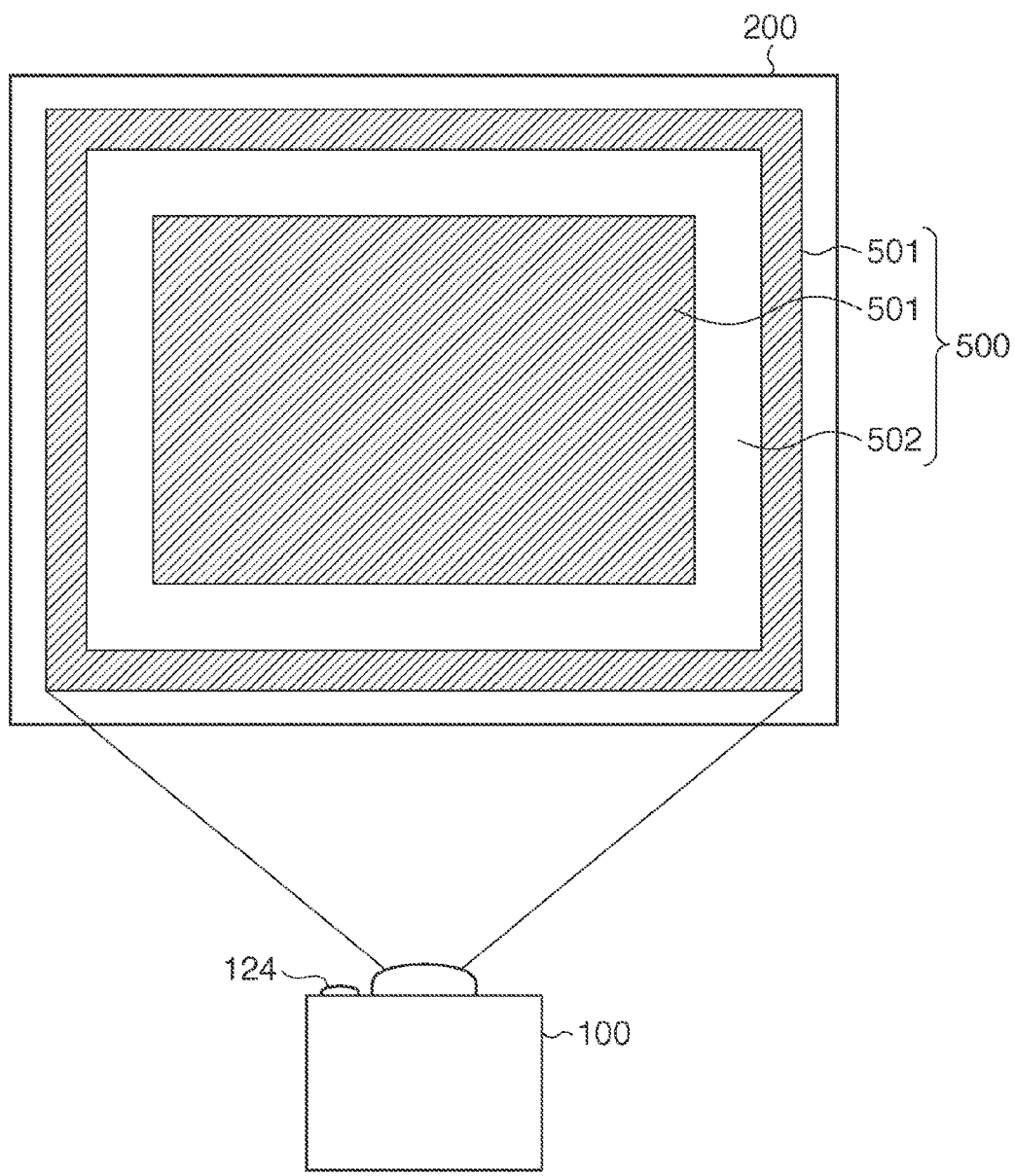
FIG. 5 is a view that explains a test pattern in a modification to the first embodiment.

Moreover, the test pattern to be displayed is not limited to the test pattern 400 shown in FIG. 3. To practice the present invention, a pattern including a black region and its remaining region with a certain brightness need only be prepared. A test pattern 500 shown in FIG. 5, for example, may be used. In the test pattern 500 shown in FIG. 5, a rectangular region at its center is a first region 501 having a black tone, and a circumferential region surrounding the first region 501 is a second region 502 having a tone with a brightness higher than a black tone.

Note that the second region (second regions 402 and 502) has, for example, a white tone in order to generate returning light to be measured. Hence, the second region may have a gray level (for example, a 75% gray level or a 50% gray level) other than white level as long as it has a tone with a brightness higher than a black tone. Also, although the first region desirably has a black tone with nearly zero brightness, it may have a brightness to some degree. In this case, two or more test patterns with different average brightness values are projected, the average brightness values of the first regions on the two test patterns, respectively, are measured, and a change in brightness of the test pattern and that in average brightness of the first region are measured. Thus, information on the ratio α of the brightness of returning light can be obtained.

When the brightness of a measurement region within the first region having a black tone is measured, not only returning light but also, for example, weak black-level light due to the influence of, for example, external light or leakage light from the liquid crystal panel (brightness-modulated panel) may be measured. If the weak black-level light is non-negligible with respect to the returning light, the image processing unit 117 may generate image data of a test pattern having all pixels with a black tone during the time after step S300 and immediately before 5301, shown in FIG. 3. In this case, the projection optical system 107 projects projection light modulated in accordance with the image data of the test pattern onto the screen 200. The image sensing unit 124 measures a brightness resulting from the weak black-level light. In step S302, the controller 101 determines a value obtained by subtracting the measured amount of weak black-level light from the average of the brightness values of the measurement regions A to H for each of R, G, and B components as the brightness of returning light for each of R, G, and B components. This makes it possible to estimate a brightness generated by returning light containing no weak black-level light.

Also, although a projector including a built-in liquid crystal panel has been described in this embodiment, the present invention is applicable to any projection apparatus, including a built-in arrangement which modulates emitted light, such as a projector including a built-in DMD panel.

Second Embodiment

A projector according to the second embodiment of the present invention will be described with reference to FIGS. 6 and 7. Differences from the first embodiment will be mainly described below.

The sequence shown in FIG. 2 in the first embodiment is modified as follows.

Figure 6:
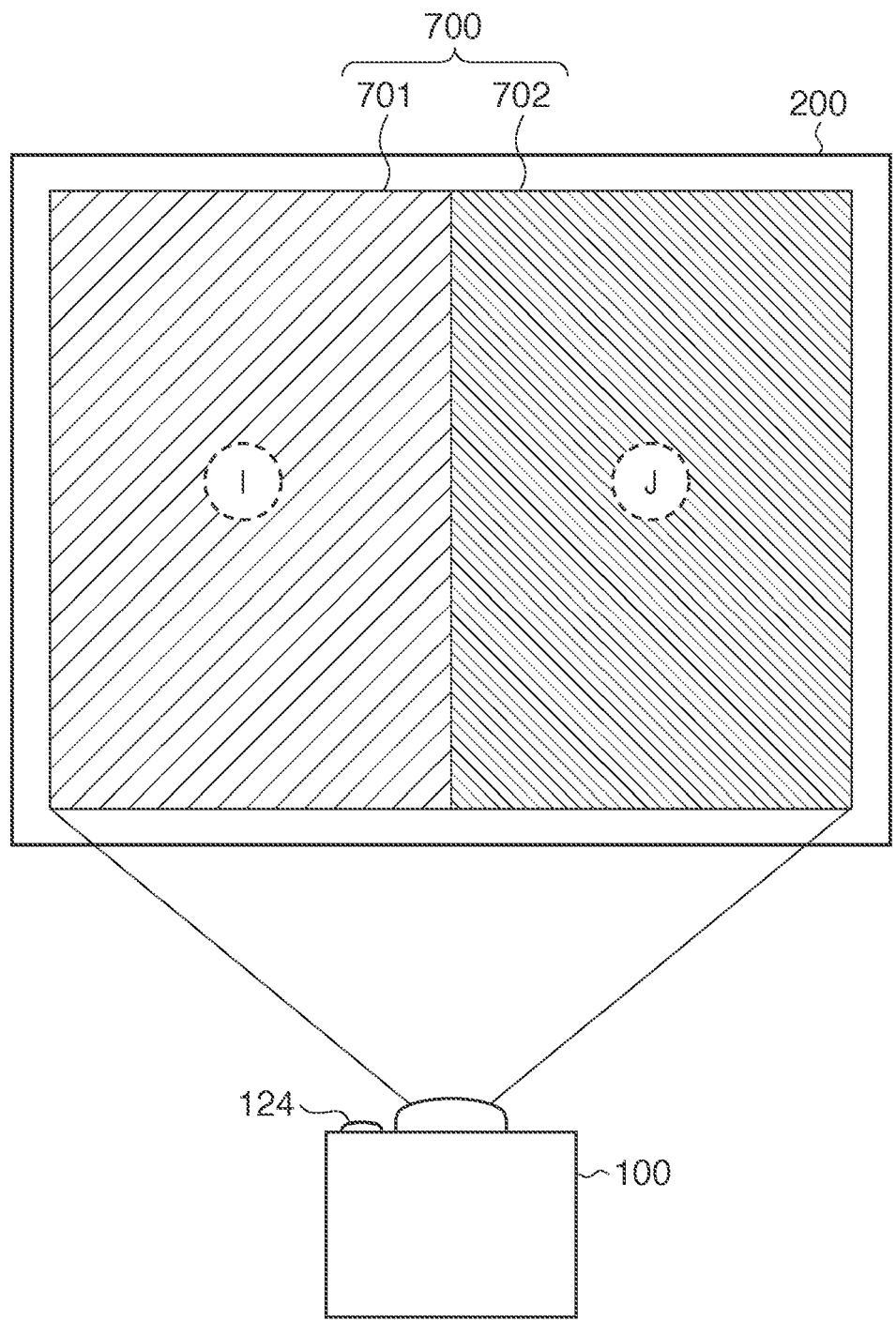
FIG. 6 is a view that explains a test pattern in the second embodiment.

In step S301, the test pattern to be displayed is modified to a test pattern 700 shown in FIG. 6. The test pattern 700 includes a first region 701 having a first gray level, and a second region 702 having a second gray level. The first region 701 is, for example, a 25% gray level region. The second region 702 is, for example, a 75% gray level region. Measurement regions I and J used in steps to be described hereinafter are set within the first region 701 and second region 702, respectively.

In step S302, the method of measuring the RGB brightness values of returning light is changed as follows. An image sensing unit 124 measures the brightness values of the first region 701 and second region 702 in the projected image of the test pattern 700 as those of predetermined measurement regions, respectively. More specifically, a controller 101 measures the brightness values of the predetermined measurement regions I and J (see FIG. 6) for each of R, G, and B (Red, Green, and Blue) components.

Next, the controller 101 estimates the brightness of returning light on the test pattern 700 in accordance with the measured brightness values of the first region 701 and second region 702. A method of estimation will be described with reference to FIG. 7.

Figure 7:
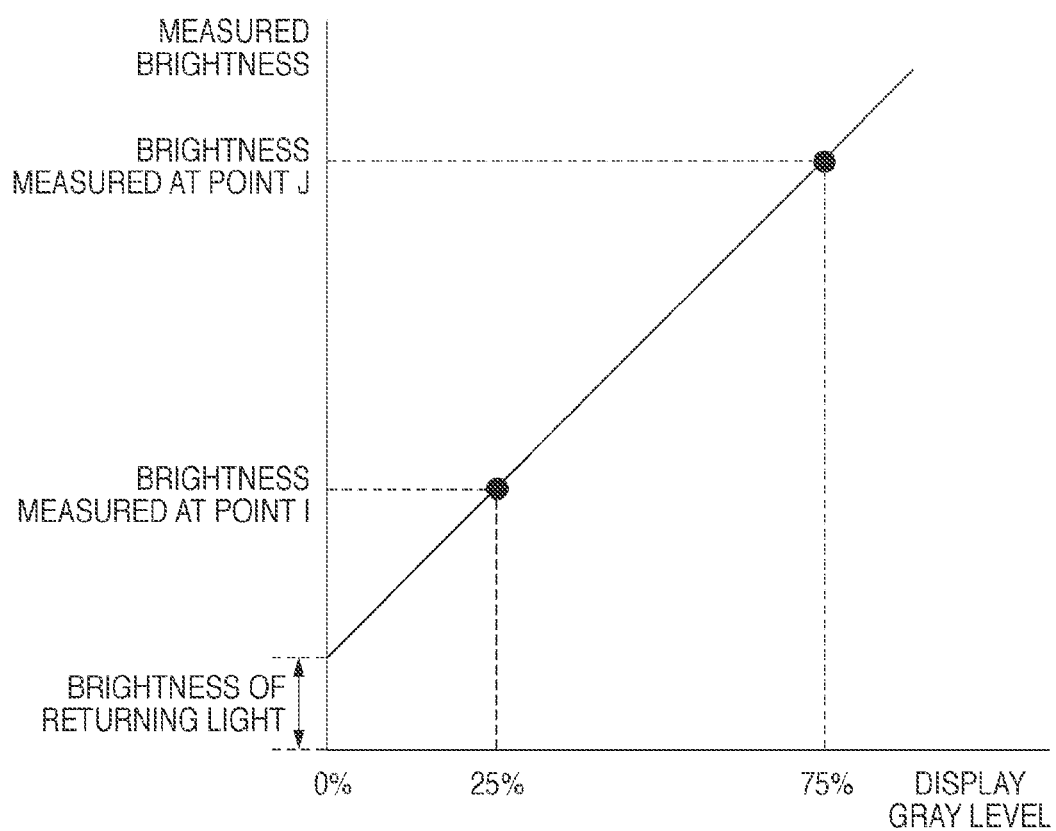
FIG. 7 is a graph that explains a method of estimating the brightness of returning light in the second embodiment.

Referring to FIG. 7, the abscissa indicates the gray level value of image data of the test pattern 700, and the ordinate indicates the brightness value measured by the image sensing unit 124. When the measurement results obtained at the points I and J are plotted in this graph and linearly interpolated, the brightness of returning light is obtained as a Y segment. With this method, returning light is calculated for each of R, G, and B components. Thus, the brightness value of returning light on a screen 200, which results from projection light on the test pattern 700, is estimated.

In step S303, the controller 101 receives the image data of the test pattern 700 from a liquid crystal driving unit 105, and obtains an average brightness β of an image corresponding to the image data of the test pattern 700. The controller 101 estimates a ratio α in accordance with the average brightness obtained from the image data and the estimated brightness of returning light. That is, the controller 101 divides the above-mentioned estimated brightness value of returning light by the average brightness value of the image data of the test pattern 700 to estimate the ratio of the brightness of returning light to the expected average brightness of the image.

Even in this way, a projected image in which returning light is canceled can be obtained, as in the first embodiment.

The test pattern to be displayed is not limited to the test pattern 700. The same effect as in this embodiment can be achieved as long as the test pattern to be displayed includes a plurality of regions having different gray levels because returning light can be estimated by measuring their gray levels and linearly interpolating the measurement results. The test pattern to be displayed may be, for example, a test pattern including regions having three gray levels: a 25% gray level, a 50% gray level, and a 75% gray level, or a test pattern having a larger number of different gray levels.

Third Embodiment

A projector according to the third embodiment of the present invention will be described next. Differences from the first embodiment will be mainly described below.

The first embodiment assumes that the surrounding environment such as the wall and ceiling of the room diffusely reflects light. Also, a model in which returning light is uniformly applied onto the screen 200 is assumed.

On the other hand, in this embodiment, a model in which returning light is nonuniformly applied onto a screen 200 because, for example, a mirror is present on the wall or an object is present near the screen 200 is assumed. A system according to this embodiment is approximated using a model in which light emitted by a projector 100 is partially reflected in a certain regular form in the room, and reaches the screen 200 again with an uneven distribution (without integration).

The third embodiment is different from the first embodiment in that in the former an image processing unit 117 further includes a generation unit 117b. The generation unit 117b generates image data of a plurality of test patterns. The plurality of test patterns are generated by dividing each test pattern into a plurality of blocks, assigning one of the plurality of blocks to a second region, and assigning the remaining blocks to a first region. The first region has a black tone. The second region has a brightness higher than a black tone. The plurality of test patterns are different from each other in that their second regions are assigned to different blocks of the pluralities of blocks. The generation unit 117b generates a test pattern as shown in, for example, FIG. 9A or 9B.

Figure 9A:
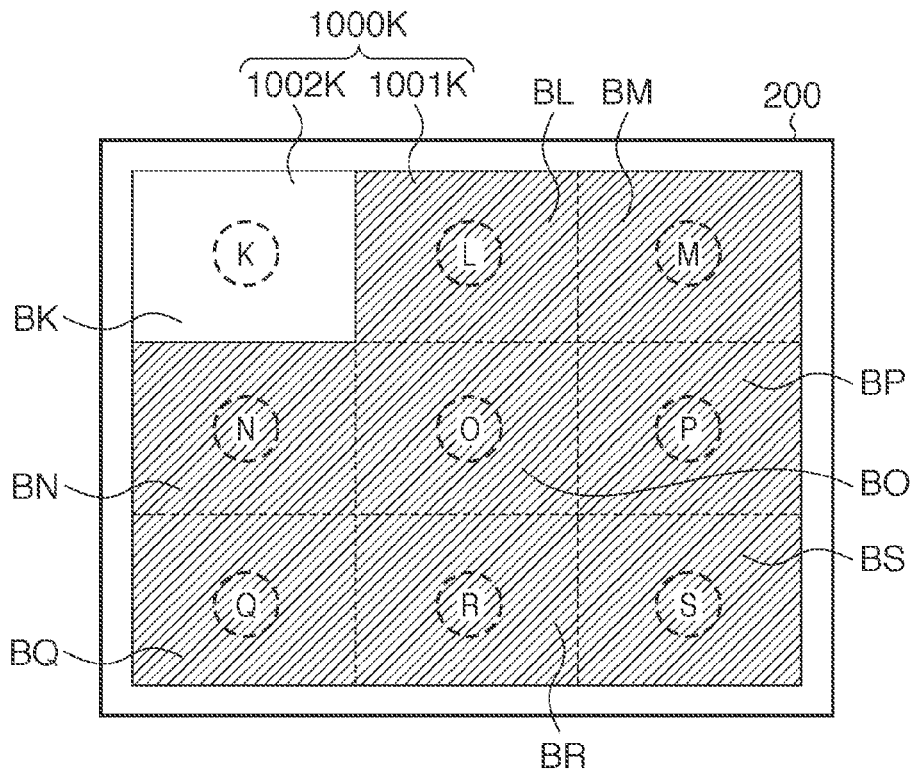
FIGS. 9A and 9B are views that explains test patterns in the third embodiment.

A test pattern 1000K shown in FIG. 9A is divided into 3×3 blocks BK to BS. In the test pattern 1000K, the block BK is assigned to a second region 1002K, and the remaining blocks BL to BS are assigned to a first region 1001K. Reference symbols K to S in FIGS. 9A and 9B denote predetermined measurement regions in the blocks BK to BS, respectively. In a test pattern 1000L shown in FIG. 9B, a block BL is assigned to a second region 1002L, and the remaining blocks BK and BM to BS are assigned to a first region 1001L. Similarly, test patterns 1000M to 1000S in which blocks BM to BS, respectively, are assigned to second regions are generated.

Figure 8:
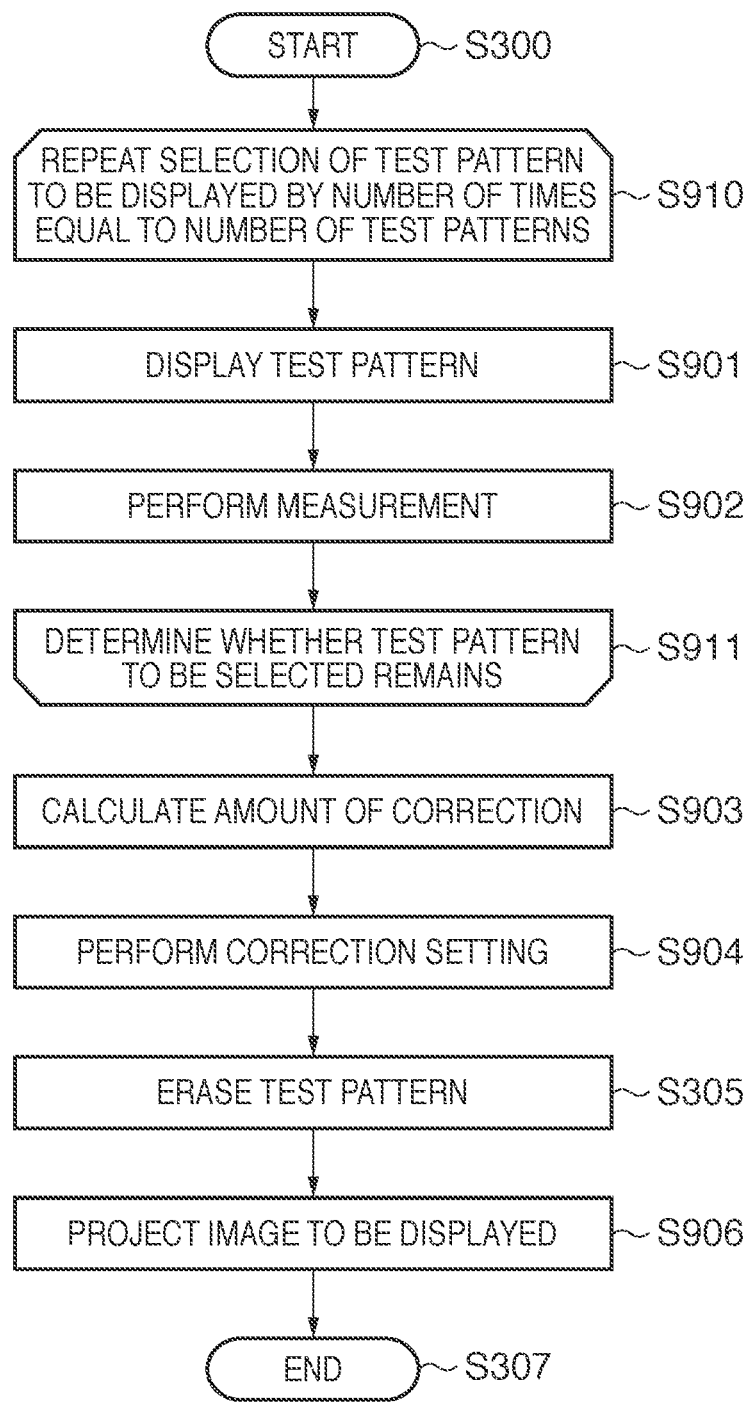
FIG. 8 is a flowchart showing a correction sequence in the third embodiment.

Also, in this embodiment, as shown in FIG. 8, a process different from the first embodiment in the following respects is performed.

A controller 101 repeatedly executes a routine in steps S910 to S911 while changing the test pattern a number of times (nine times in this example) equal to the number of test patterns.

Figure 9B:
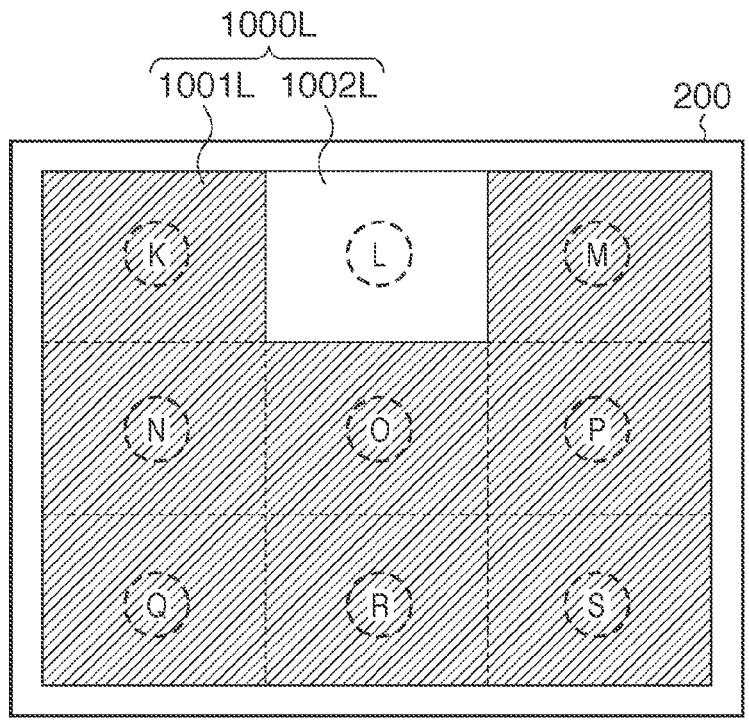

More specifically, in step S910, the controller 101 selects a test pattern to be processed from unselected test patterns among the plurality of test patterns. For example, in the first routine, the test pattern 1000K in which the block BK shown in FIG. 9A is assigned to the second region 1002K is selected. In the second routine, the test pattern 1000L in which the block BL shown in FIG. 9B is assigned to the second region 1002L is selected. In the third routine, a test pattern (not shown) in which the block BM is assigned to the second region is selected. In this way, the test pattern is sequentially changed.

In step S901, the controller 101 issues a command to the image processing unit 117 to display an image of the selected test pattern. The generation unit 117b of the image processing unit 117 generates image data of the selected test pattern. The same process as in step S301 is performed, so a projection optical system 107 projects projection light modulated in accordance with the image data of the selected test pattern onto the screen 200. Thus, the test pattern 1000K shown in FIG. 9A or the test pattern 1000L shown in FIG. 9B, for example, is displayed on the screen 200.

In step S902, an image sensing unit 124 measures the brightness values of all blocks, to which the first region in the projected image of the selected test pattern is assigned, as those of predetermined measurement regions. For example, the image sensing unit 124 measures the brightness values of all the blocks BL to BS to which the first region 1001K in the projected image of the test pattern 1000K shown in FIG. 9A is assigned, that is, those of the predetermined measurement regions L to S for each of R, G, and B components. Thus, brightness values LKL to LKS of the measurement regions L to S, respectively, are obtained. Alternatively, for example, the image sensing unit 124 measures the brightness values of all the blocks BK and BM to BS to which the first region 1001L in the projected image of the test pattern 1000L shown in FIG. 9B is assigned, that is, those of the measurement regions K and M to S for each of R, G, and B components. Thus, brightness values LLK and LLM to LKS of the measurement regions K and M to S, respectively, are obtained.

In step S911, the controller 101 determines whether a test pattern to be selected remains among the plurality of test patterns. If the controller 101 determines that a pattern to be selected remains, the process returns to step S910; otherwise, the process advances to step S903.

By repeating steps S901 and S902 nine times, brightness values Lij (i, j=K, L, M, ..., S, i≠j) of the predetermined measurement regions in the first region having a black tone is obtained, where i indicates measurement regions, which have tones (for example, a white tone) with brightness values higher than a black tone, among the measurement regions K to S, and j indicates the measurement regions K to S to be measured. That is, Lij is the brightness at the position j when light in the second region (for example, a white region) at the position i is applied onto the screen as returning light. For example, LLS is the brightness of the lower light measurement region S when the test pattern 1000L shown in FIG. 9B is displayed. As a matter of course, these variables exist for each of R, G, and B components, as described earlier, but a description thereof will not be given.

In step S903, the controller 101 obtains an average brightness βi (i=K to S) of image data of each test pattern 1000i (i=K to S). The controller 101 estimates a ratio αij of the brightness of returning light to the expected average brightness of the image of the test pattern for each block Bj (for i≠j) in accordance with the average brightness βi obtained from the image data, and the brightness Lij of the predetermined measurement region. That is, the controller 101 estimates the ratio of the brightness of returning light to the expected average brightness of the image by dividing the brightness Lij of the predetermined measurement region by the expected average brightness value βi of the image of the test pattern 1000i. The suffix i in the ratio αij indicates a block to which the second region is assigned in the test pattern used to obtain this ratio, as mentioned above. The suffix j in the ratio αij indicates a block which includes a measurement region in the test pattern, which is used to obtain this ratio, as mentioned above. That is, the controller 101 estimates the ratio αij for each measured block (j) in association with the block (i) to which the second region is assigned.

The controller 101 interpolates a ratio αii (i=K, L, S) to a block Bi to which the second region is assigned in the test pattern 1000i. The values of the ratio αii are not obtained as a result of measurement, and are therefore estimated from the values in its neighborhood. For example, a ratio αKK can be obtained by calculating the average of values αKL, αKN, αLK, and αNK in its neighborhood as:

$$\alpha KK = (\alpha KL + \alpha KN + \alpha LK + \alpha NK)/4$$

A correction method will be described herein. Although α is a scalar value in the first embodiment, it is a vector value in the third embodiment. Hence, the same correction can be performed by vector calculation using the same method. In this embodiment, an image projected onto the screen is divided into 3×3 parts. An input $x_i$ (i=K, L, M, ..., S) is defined as the expected average brightness of an image for each block when no returning light is present. Also, an output $y_i$ (i=K, L, M, ..., S) is defined as the average brightness of a projected image for each block when returning light acts. Then, the input $x_i$ and output $y_i$ have an input/output relationship:

$$y_i = x_i + \sum_{j=K}^{S} \alpha_{ij} x_j \qquad (7)$$

Assuming that a projected image free from any returning light is to be attained as the output, the output yi is substituted by the average brightness βi (i=K, L, M, ..., S) of the image data of the test pattern before correction, and the input xi is substituted by an average brightness β'i (i=K, L, M, ..., S) of the image data of the test pattern. Then, the vectors of the average brightness values βi and β'i have a relation:

$$\beta = \beta' + \alpha\beta' = (I+\alpha)\beta' \qquad (8)$$

for $$\beta = \begin{pmatrix} \beta_K \\ \vdots \\ \beta_S \end{pmatrix} \qquad (9)$$

$$\beta' = \begin{pmatrix} \beta'_K \\ \vdots \\ \beta'_S \end{pmatrix}$$

$$\alpha = \begin{pmatrix} \alpha_{KK} & \cdots & \alpha_{KS} \\ \vdots & \ddots & \vdots \\ \alpha_{SK} & \cdots & \alpha_{SS} \end{pmatrix}$$

I: Identity Matrix

In equation (7), the product of the vectors is the inner product. Hence, solving equation (8) for β' yields a correction equation:

$$\beta' = (I+\alpha)^{-1}\beta \qquad (10)$$

As can be seen from the foregoing calculation, equation (10) means that when projection light modulated in accordance with the image data having the average brightness β'i is projected, the same projected image as that which has the average brightness βi and is virtually free from any returning light is displayed upon adding the brightness of returning light resulting from the projection to the average brightness β'i. An amount of offset correction $offset_i$ (i=K, L, M, ..., S) when the projected image is attained by offset correction is given by:

$$offset_i = \beta' - \beta = \{(I+\alpha)^{-1} - I\}\beta \qquad (11)$$

for $$offset_i = \begin{pmatrix} offset_K \\ \vdots \\ offset_S \end{pmatrix} \qquad (12)$$

In step S904, the controller 101 stores information on the ratio αij of the brightness of returning light to that of projection light in an internal memory 116. Also, the controller 101 sets the image processing unit 117 so as to perform image correction which uses the ratio αij for each frame.

In step S906, a correction unit 117a of the image processing unit 117 performs the following process in accordance with the above-mentioned setting by the controller 101. The correction unit 117a sequentially stores, in the internal memory 116, each frame of image data sequentially input to it. At the same time, the correction unit 117a divides the average brightness of each frame for each of R, G, and B components into 3×3 parts, as in the test pattern, and calculates the average brightness of a total of nine values βij. The correction unit 117a calculates an $offset_i$ correction value of that frame using the ratio αij and the values βij and equation (11) mentioned above. The $offset_i$ correction value is added to the brightness value of each pixel of a corresponding block to create a corrected image of each frame, which is sequentially output to a liquid crystal driving unit 105. The projected image corrected in the foregoing way is close to a projected image obtained under the environment in which no returning light is present.

As described above, in this embodiment, even if returning light is nonuniformly applied onto the screen 200 because, for example, a mirror is present on the wall or an object is present near the screen 200, offset correction can be performed for each of, for example, 3×3 regions. As a result, even if returning light is nonuniformly applied onto the screen 200, the corrected projected image is close to a projected image obtained under the environment in which no returning light is present.

Although the image is divided into 3×3 blocks in this embodiment, the present invention is not limited to this division method. Since the present invention can be practiced as long as the second region in the test pattern can be shifted to a plurality of positions, the image may be divided into, for example, 2×2 blocks, 4×4 blocks, or a larger number of blocks. In general, as the image is finely divided into smaller parts, the correction accuracy improves, and more minute unevenness of returning light on the screen can be cancelled. However, as the image is roughly divided into larger parts, the scale of matrix calculation decreases, and the calculation cost can be reduced.

Each test pattern may be generated by dividing a test pattern into a plurality of blocks, assigning at least a partial region of one of the plurality of blocks to a second region, and assigning the remaining region in the test pattern to a first region. At this time, the plurality of test patterns are generated such that blocks, to which second regions are assigned, are different from each other among pluralities of blocks.

For example, the plurality of test patterns may be test patterns 1000K' to 1000S' as shown in 10A or 10B.

Figure 10A:
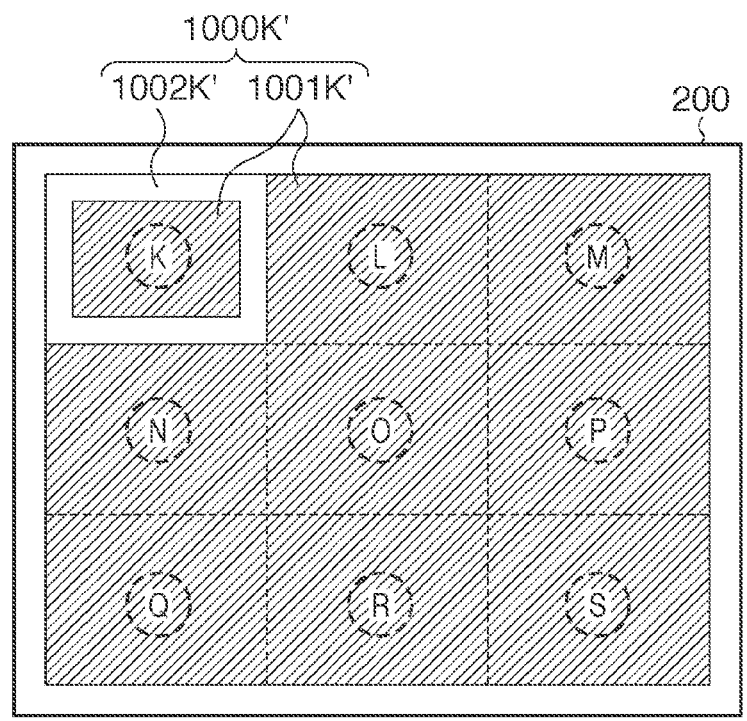
FIGS. 10A and 10B are views that explains test patterns in a modification to the third embodiment.

In the test pattern 1000K' shown in FIG. 10A, a rectangular region at the center of a block BK is a first region 1001K' having a black tone, and a circumferential region surrounding the rectangular region at the center is a second region 1002K' having a tone with a brightness higher than a black tone. The first region 1001K' is also assigned to the remaining blocks BL to BS. That is, in the test pattern 1000K' shown in FIG. 10A, the second region 1002K' is assigned to a circumferential region as at least a partial region in the block BK, and the first region 1001K' is assigned to the remaining regions in the test pattern 1000K'.

Figure 10B:
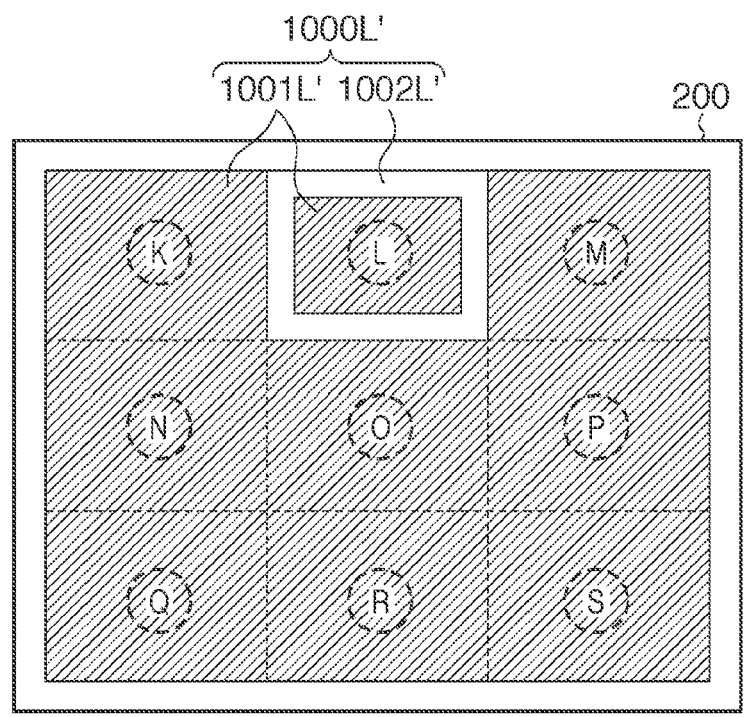

In the test pattern 1000L' shown in FIG. 10B, a rectangular region at the center of a block BL is a first region 1001L' having a black tone, and a circumferential region surrounding the rectangular region at the center is a second region 1002L' having a tone with a brightness higher than a black tone. The first region 1001L' is also assigned to the remaining blocks BK and BM to BS. That is, in the test pattern 1000L' shown in FIG. 10B, the second region 1002L' is assigned to a circumferential region as at least a partial region in the block BL, and the first region 1001L' is assigned to the remaining regions in the test pattern 1000L.

Also, in this case, of the sequence shown in FIG. 8 in the third embodiment, a portion to be described hereinafter is modified.

In step S901, a test pattern to be displayed on the screen 200 is set to, for example, the test patterns 1000K' to 1000S' shown in FIGS. 10A and 10B. Thus, in step S902, all measurement regions K to S shown in FIGS. 10A and 10B become first regions having a black tone, and therefore can be used to measure the brightness value of returning light for each of R, G, and B (Red, Green, and Blue) components.

Hence, in step S904, the brightness values which are obtained by estimating the ratio $\alpha ii$ using interpolation in the third embodiment can be measured, and this obviates the need for the estimation method.

A projector according to the third embodiment of the present invention will be described next.

A modification to the first embodiment, in which the correction method is modified from offset correction to gain correction, is also possible. Of the sequence shown in FIG. 2 in the first embodiment, a portion to be described hereinafter is modified.

In step S303, a gain correction value "gain" to realize equation (2) by gain correction is given by:

$$\text{gain} = \beta'/\beta = 1/(1+\alpha) \quad (13)$$

In step S306, the correction unit 117a of the image processing unit 117 asynchronously performs the following correction process in accordance with the above-mentioned setting by the controller 101. The correction unit 117a sequentially stores, in the internal memory 116, image data, to be displayed, of each of a plurality of frames sequentially input to it, and calculates an average brightness $\beta d$ of the image data of each frame for each of R, G, and B components. Also, the correction unit 117a accesses the internal memory 116, and acquires information on the ratio $\alpha$ of the brightness of returning light to that of projection light. The correction unit 117a corrects the image data to be displayed so that a projected image is displayed on the screen (target surface) 200 after the brightness of returning light is canceled, in accordance with the estimated ratio $\alpha$ and the average brightness $\beta d$ of the image data to be displayed. More specifically, the correction unit 117a performs correction in which $\beta d$ and $\beta d'$ are substituted for and $\beta'$, respectively, in equation (13) mentioned above. That is, the correction unit 117a corrects the image data of the pattern to be displayed so as to amplify the brightness of each pixel of the image data to be displayed by a gain value "gain" which satisfies:

$$\text{gain} = 1/(1+\alpha) \quad (14)$$

Fourth Embodiment

The invention according to the first to third embodiments can be practiced by executing a process of supplying software (program) which implements the functions in the above-mentioned embodiments to a system or an apparatus via a network or various kinds of storage media, and reading out and executing the program by a computer (or a CPU or an MPU) of the system or apparatus.

Also, to prevent the quality of a projected image from degrading due to factors associated with returning light on the projected image, the schemes described in the first to fourth embodiment may be used solely or in combination as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-289649, filed Dec. 21, 2009, which is hereby incorporated by reference herein in its entirety.

What is claimed is:

1. A display apparatus comprising:
a display unit adapted to display an image corresponding to input image data on a display surface;
an acquisition unit adapted to acquire a brightness of the image displayed on the display surface by said display unit; and
a controller adapted to control said display unit so as to reduce a difference between the input image data and the image displayed on the display surface by said display unit, based on the image data input to said display unit, and the image acquired by said acquisition unit,
wherein said controller estimates a ratio of an amount of light which forms the image displayed on the display surface by said display unit, is reflected by an object different from the display surface, and enters the display surface again, to a total amount of light which forms the image, based on an average of brightness values exhibited by the image data input to said display unit, and a brightness of the image displayed on the display surface, and
wherein said controller controls said display unit to display the image after correcting the input image data, based on the estimated ratio.

2. The apparatus according to claim 1,
wherein said controller controls said display unit to display the image after correcting the image data so as to reduce a difference in brightness between the input image data and the image displayed on the display surface by said display unit.

3. The apparatus according to claim 1,
wherein said controller controls said display unit to display an image corresponding to image data of a specific display pattern at a predetermined timing, and controls said acquisition unit to acquire the brightness of the image, which corresponds to the specific display pattern and is displayed on the display surface, at the predetermined timing, and
wherein said controller estimates the ratio based on the image data of the specific display pattern, and the brightness of the image acquired by said acquisition unit at the predetermined timing.

4. The apparatus according to claim 3,
wherein said controller includes a memory adapted to store the estimated ratio, and
wherein said controller controls said display unit based on the ratio stored in said memory.

5. The apparatus according to claim 3,
wherein the image data of the specific display pattern comprises image data including a first region having a first gray level, and a second region having a second gray level.

6. The apparatus according to claim 1,
wherein said controller controls said display unit so that an average brightness $\beta d'$ of the input image data after correction satisfies:

$$\beta d' = \beta d/(1+\alpha)$$

where $\alpha$ is the ratio, and $\beta d$ is the average of the brightness values exhibited by the input image data.

7. The apparatus according to claim 6,
wherein said controller controls said display unit to correct the input image data so as to remove an amount of offset "offset" given by:

$$\text{offset} = \alpha\beta d/(1+\alpha)$$

from a brightness of each pixel of the input image data.

8. The apparatus according to claim 6,
wherein said controller controls said display unit to correct the input image data so as to amplify a brightness of each pixel of the input image data by a gain value "gain" given by:

$$\text{gain} = 1/(1+\alpha).$$

9. A display apparatus comprising:
a display unit adapted to display an image corresponding to input image data on a display surface;
an acquisition unit adapted to acquire a brightness of the image displayed on the display surface by said display unit; and
a controller adapted to control said display unit so as to reduce a difference between the input image data and the image displayed on the display surface by said display unit, based on a plurality of image data input to said display unit, and images which correspond to the plurality of image data and are acquired by said acquisition unit,
wherein said controller estimates a ratio of an amount of light which forms the image displayed on the display surface by said display unit, is reflected by an object different from the display surface, and enters the display surface again, to a total amount of light which forms the image, based on an average of brightness values of the plurality of image data, respectively, input to said display unit, and brightness values of the images which correspond to the plurality of image data, respectively, and are displayed on the display surface, and
wherein said controller controls said display unit to display the image after correcting the input image data, based on the estimated ratio.

10. The apparatus according to claim 9,
wherein said controller controls said display unit to display the image after correcting the image data so as to reduce a difference in brightness between the input image data and the image displayed on the display surface by said display unit.

11. The apparatus according to claim 9,
wherein said controller controls said display unit to sequentially display images corresponding to image data of a plurality of specific display patterns at a predetermined timing, and controls said acquisition unit to acquire the brightness of the images, which correspond to the plurality of specific display patterns, respectively, and are displayed on the display surface, at the predetermined timing, and
wherein said controller estimates the ratio based on the image data of the plurality of specific display patterns, and the brightness of the images which correspond to the plurality of specific display patterns, respectively, and are acquired by said acquisition unit at the predetermined timing.

12. The apparatus according to claim 11,
wherein said controller includes a memory adapted to store the estimated ratio, and wherein said controller controls said display unit based on the ratio stored in said memory.

13. The apparatus according to claim 11, wherein the image data of the plurality of specific display patterns comprises image data including a first region having a first gray level, and a second region having a second gray level.

14. The apparatus according to claim 9, wherein said controller controls said display unit so that an average brightness βd' of the input image data after correction satisfies:

$$\beta d' = \beta d/(1+\alpha)$$

where α is the ratio, and βd is the average of the brightness values exhibited by the input image data.

15. The apparatus according to claim 14, wherein said controller controls said display unit to correct the input image data so as to remove an amount of offset "offset" given by:

$$\text{offset} = \alpha \beta d/(1+\alpha)$$

from a brightness of each pixel of the input image data.

16. The apparatus according to claim 14, wherein said controller controls said display unit to correct the input image data so as to amplify a brightness of each pixel of the input image data by a gain value "gain" given by:

$$\text{gain} = 1/(1+\alpha).$$

17. A method of controlling a display apparatus comprising a display unit adapted to display an image corresponding to input image data on a display surface, and an acquisition unit adapted to acquire a brightness of the image displayed on the display surface by the display unit, the method comprising controlling the display unit so as to reduce a difference between the input image data and the image displayed on the display surface by the display unit, based on the image data input to the display unit, and the image acquired by the acquisition unit, wherein said control step estimates a ratio of an amount of light which forms the image displayed on the display surface by said display unit, is reflected by an object different from the display surface, and enters the display surface again, to a total amount of light which forms the image, based on an average of brightness values exhibited by the image data input to said display unit, and a brightness of the image displayed on the display surface, and wherein said control step controls said display unit to display the image after correcting the input image data, based on the estimated ratio.

18. A method of controlling a display apparatus comprising a display unit adapted to display an image corresponding to input image data on a display surface, and an acquisition unit adapted to acquire a brightness of the image displayed on the display surface by the display unit, the method comprising controlling the display unit so as to reduce a difference between the input image data and the image displayed on the display surface by the display unit, based on a plurality of image data input to the display unit, and images which correspond to the plurality of image data and are acquired by the acquisition unit, wherein said control step estimates a ratio of an amount of light which forms the image displayed on the display surface by said display unit, is reflected by an object different from the display surface, and enters the display surface again, to a total amount of light which forms the image, based on an average of brightness values of the plurality of image data, respectively, input to said display unit, and brightness values of the images which correspond to the plurality of image data, respectively, and are displayed on the display surface, and wherein said control step controls said display unit to display the image after correcting the input image data, based on the estimated ratio.

* * * * *